(12) United States Patent
Kuschmeader et al.

(10) Patent No.: US 11,926,289 B2
(45) Date of Patent: Mar. 12, 2024

(54) BICYCLE RACK WITH ASSEMBLY FEATURES

(71) Applicant: Kuat Innovations LLC, Springfield, MO (US)

(72) Inventors: Luke Kuschmeader, Springfield, MO (US); Jonathan Graif, Springfield, MO (US)

(73) Assignee: Kuat Innovations LLC

( * ) Notice: Subject to any disclaimer, the term of this patent is extended or adjusted under 35 U.S.C. 154(b) by 0 days.

(21) Appl. No.: 17/588,378

(22) Filed: Jan. 31, 2022

(65) Prior Publication Data

US 2023/0242044 A1     Aug. 3, 2023

(51) Int. Cl.
*B60R 9/10*     (2006.01)
(52) U.S. Cl.
CPC ..................... *B60R 9/10* (2013.01)
(58) Field of Classification Search
CPC ....... B60R 9/06; B60R 9/10; Y10T 403/1608; Y10T 403/12; F16B 9/09
See application file for complete search history.

(56) References Cited

U.S. PATENT DOCUMENTS

| | | | | |
|---|---|---|---|---|
| 2,746,659 | A | * | 5/1956 | Caruolo ..................... B60R 9/06 224/528 |
| 5,215,232 | A | * | 6/1993 | Wyers ....................... B60R 9/06 224/532 |
| 5,549,231 | A | * | 8/1996 | Fletcher .................... B60R 9/06 211/20 |
| 5,755,454 | A | * | 5/1998 | Peterson ................... B60D 1/52 280/491.1 |
| 6,651,996 | B1 | * | 11/2003 | Allemang ................. B60R 9/10 280/402 |
| 7,806,308 | B2 | * | 10/2010 | Gunn ........................ B60R 9/06 248/222.51 |
| 8,397,441 | B2 | | 3/2013 | Wallance |
| 10,611,312 | B1 | * | 4/2020 | Sullivan .................. B60D 1/58 |
| 10,668,866 | B2 | * | 6/2020 | Kuschmeader ........... B60R 9/10 |

(Continued)

FOREIGN PATENT DOCUMENTS

WO     2021152007 A1     8/2021

OTHER PUBLICATIONS

International Search Report dated Jun. 27, 2023 in re PCT/US 23/60957.

*Primary Examiner* — Scott T McNurlen
(74) *Attorney, Agent, or Firm* — Kutak Rock LLP; James H Jeffries

(57) ABSTRACT

Equipment such as bicycle racks are often delivered to the end user in a partially assembled state. The component subassemblies may be heavy or unwieldy in size, making it difficult for the end user to hold the subassemblies in the correct positions with respect to each other while attaching the fasteners that hold the subassemblies together while the equipment is in use. An equipment rack is described having features that hold the subassemblies in an assembled configuration while the operational fasteners are added or engaged to hold the equipment rack in its final, assembled configuration. These features may be surface features that the end user is able to engage with each other to provide support to subassemblies and hold them in the proper orientation and position while the operational fasteners are aligned, inserted, tightened, or otherwise affixed to the assembled parts.

3 Claims, 6 Drawing Sheets

(56) References Cited

U.S. PATENT DOCUMENTS

| | | | |
|---|---|---|---|
| 11,718,241 B2* | 8/2023 | Schulz | B60R 9/06 |
| | | | 224/505 |
| 2001/0040139 A1 | 11/2001 | Dean | |
| 2005/0082329 A1* | 4/2005 | Cohen | B60R 9/10 |
| | | | 224/924 |
| 2009/0028679 A1* | 1/2009 | Smith | B60P 1/4421 |
| | | | 414/800 |
| 2011/0132946 A1 | 6/2011 | Sautter | |
| 2020/0156724 A1* | 5/2020 | Kuschmeader | B62H 3/12 |
| 2021/0129643 A1 | 5/2021 | Voss | |
| 2021/0245671 A1 | 12/2021 | Kuschmeader | |
| 2022/0266762 A1* | 8/2022 | Bowe | B60R 9/10 |
| 2022/0314895 A1* | 10/2022 | Wärnelöv | B60R 9/06 |

* cited by examiner

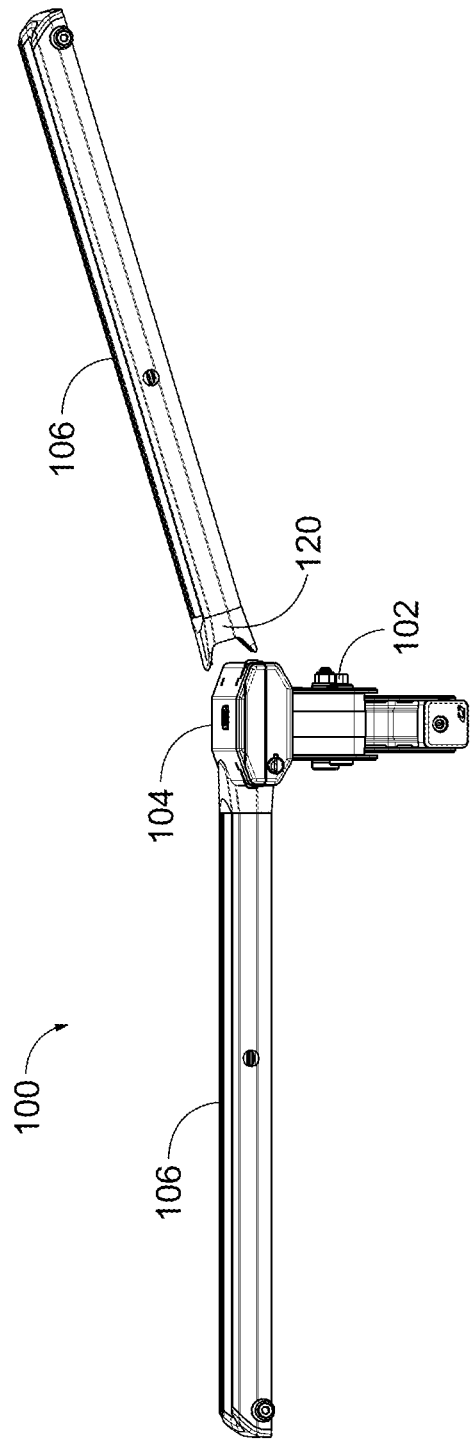
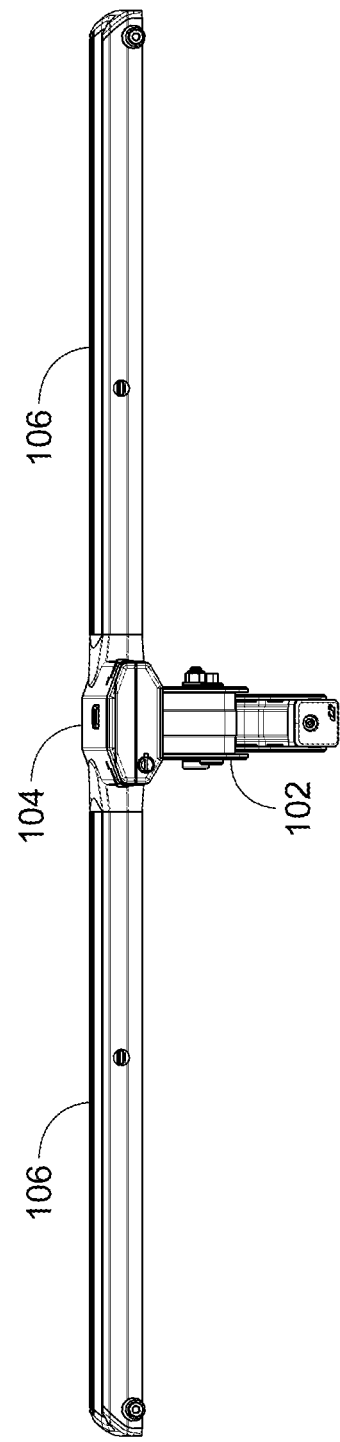
FIG. 1A
FIG. 1B

BICYCLE RACK WITH ASSEMBLY FEATURES

CROSS-REFERENCE TO RELATED APPLICATIONS

None.

BACKGROUND

Field of the Invention

This disclosure is in the field of equipment racks for vehicles. More specifically, this disclosure is in the field of equipment racks designed to be partially assembled by an end user.

Description of the Related Art

Many bicycle racks or other types of equipment racks for use are delivered to end users in a partially assembled state. The user may be required to attach a pivotal hub to a support member, and one or more platform members (or other type of bicycle supporting members) to the support member. Other subassemblies may be delivered to the end user for final assembly, such as a bicycle rack add-on or extension rack to allow the bicycle rack to support additional bicycles. One example of such a bicycle rack is described in U.S. Pat. No. 10,668,866, the disclosure of which is incorporated herein by reference. Other types of equipment racks, in addition to bicycle racks, may also require assembly of subassemblies when utilizing the product.

These racks often include sizable components or heavy extrusions of metal that may be unwieldy for the end user to hold in place during installation or assembly. For example, it may be difficult or impossible for some end users to hold a bicycle platform member in the proper position with respect to the support member of the rack while also inserting, aligning, and tightening permanent fasteners such as bolts.

In some cases, it may be desired to reduce the number of fasteners so that three or more subassemblies must be held in the proper position for the installation of a single fastener that connects the subassemblies. A single person is not physically able to hold two parts or subassemblies in position while also inserting or attaching a fastener to hold the parts or subassemblies in place.

Thus, it is desirable to have a bicycle rack, or other equipment rack, with features that ease the assembly process for end users or allow the use of fewer fasteners. Similar features may also be useful on other types of equipment racks in addition to bicycle racks.

SUMMARY OF THE INVENTION

In various embodiments, the inventive equipment rack is a bicycle rack that includes a support member configured to connect to a vehicle, the surface of the support member has an upper chamfer portion and a first attachment feature is disposed on the upper chamfer portion, a platform member that has an end with an upper saddle, and the upper saddle is configured to contact the upper chamfer portion of the support member when the bicycle rack is in an assembled configuration, and a second attachment feature is disposed on the upper saddle, and the first attachment feature is configured to engage the second attachment feature to support the platform member in the assembled configuration.

In some embodiments of the inventive bicycle rack the first attachment feature is an aperture or an indentation, and the second attachment feature is a protrusion extending downwardly from the upper saddle. In other embodiments of the inventive bicycle rack the first attachment feature is a protrusion extending upwardly from the upper chamfer portion of the support member, and the second attachment feature is an aperture or an indentation in the lower surface of the upper saddle. In some embodiments of the inventive bicycle rack the support member has a side wall adjacent to the upper chamfer portion, and the platform member has an end wall adjacent to the upper saddle, and the side wall of the support member contacts the end wall of the platform member when the platform member is in the assembled configuration.

In additional embodiments of the inventive bicycle rack the support member has a lower chamfer portion and the platform member has a lower saddle, and the lower chamfer portion contacts the lower saddle when the platform member is in the assembled configuration. In some embodiments of the inventive bicycle rack the protrusion is a tooth having at least one angled side.

In other embodiments of the inventive bicycle rack for a vehicle, the bicycle rack includes a support member connected to the vehicle, the support member with a first assembly feature on its surface, a platform member with a second assembly feature extending from its end, where the second assembly feature engages the first assembly feature to support the platform member in an assembled position on the support member during assembly of the bicycle rack. In some embodiments of the inventive bicycle rack the first assembly feature is an aperture or an indentation in the support member. In some of the embodiments the second assembly feature is a protrusion shaped to insert into the aperture or indentation. In other embodiments the second assembly feature is an aperture or an indentation in the platform member, and the first assembly feature is a protrusion shaped to insert into the aperture or indentation.

In some embodiments of the inventive bicycle rack the second assembly feature is located on an upper flange extending from the end of the platform member configured to engage an upper surface of the support member. In some of the embodiments a lower flange extends from the end of the platform member and engages a lower surface of the support member.

In varying embodiments of the inventive bicycle rack the first assembly feature is a hole in the upper surface of the support member, and the second assembly feature is a tooth configured to insert into the hole. In some of these embodiments the tooth extends downwardly from a flange extending outwardly from the end of the platform member.

Some embodiments of the invention include a method of assembling a bicycle rack comprising the steps of providing a bicycle rack with a support member and a platform member, where the support member has a first assembly feature and the platform member has a second assembly feature, positioning the platform member in a first orientation with respect to the support member, engaging the first assembly feature with the second assembly feature, and pivoting the platform member from the first orientation to a second orientation where it is supported by the support member. In these embodiments the second orientation is an assembled configuration of the bicycle rack.

In some embodiments of the inventive method the first assembly feature is a protrusion and the second assembly feature is an aperture or an indentation, and the step of engaging the first assembly feature with the second assembly feature comprises inserting the protrusion into the aperture or indentation. In other embodiments of the method the second assembly feature is a protrusion, and the first assembly feature is an aperture or an indentation, and the step of engaging the first assembly feature with the second assembly feature includes inserting the protrusion into the aperture or indentation.

In some embodiments of the method the first assembly feature is disposed on an upper surface of the support member, and the second assembly feature is disposed above an end wall of the platform member. In some embodiments an end wall of the platform member contacts a side wall of the support member in the assembled configuration. In some of these embodiments the support member has a chamfer portion, and the platform member has a saddle feature, and the saddle feature contacts the chamfer portion in the assembled configuration. In some embodiments of the method, the support member is attached to and supported by a vehicle before the platform members are temporarily attached thereto using the assembly features.

In some embodiments the surface features are positioned to prevent incorrect assembly of the components of the bicycle rack. In some of these embodiments the surface features are positioned asymmetrically or off-axis with respect to the operational fasteners. In some embodiments the surface features are releasably engaged so that the product may be disassembled by removing the fastener and disengaging the surface feature without damage to the surface feature or the assemblies in the product.

BRIEF DESCRIPTION OF THE DRAWINGS

FIG. 1A is an end view of an embodiment of the inventive bicycle rack in a partially assembled configuration.

FIG. 1B is an end view of an embodiment of the inventive bicycle rack in an assembled configuration.

DETAILED DESCRIPTION

Figure 2A:
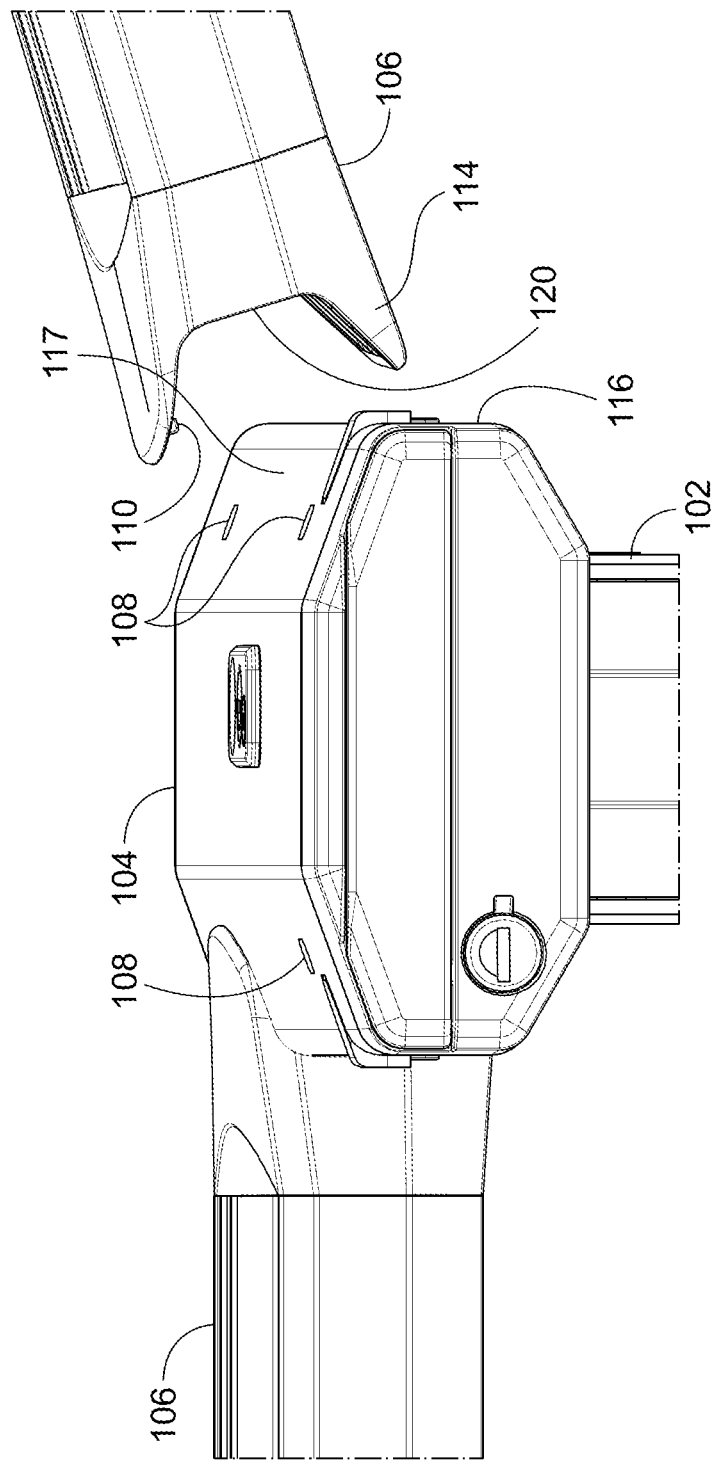
FIG. 2A is a detail perspective view of an embodiment of the inventive bicycle rack in a partially assembled configuration.

To maximize packaging and shipping efficiency, minimize shipping cost, or for other reasons, it may be preferable to deliver some bicycle racks to the end user in a partially assembled configuration. The rack may be provided as major subassemblies that are attached together by the user by installing a relatively small number of bolts or other fasteners. This may allow more compact packaging and reduce overall costs for the bicycle rack. Although the assembly process may not be technically complicated it may be practically difficult due to the necessity of holding one relatively large piece of the rack, or more, simultaneously in place against another piece while inserting, aligning, starting, and tightening one or more bolts at the same time. The size, weight, and shape of some of the parts, such as the platform members described below, may make it difficult for some end users to assemble the bicycle rack without assistance from another person or may cause them to pay someone to assemble the rack for them at additional cost.

The inventive bicycle rack avoids the need for an end user to hold the components or subassemblies together while inserting, aligning, or tightening the connecting bolts or other operational fasteners of some subassemblies of the rack. Instead, the major subassemblies of the rack may be temporarily positioned with respect to each other and held in place by apertures, indentations, hooks, teeth, protrusions, straps, or other features on or adjacent to the surface of the subassemblies. These features may be referred to as attachment features or assembly features.

This inventive system allows the user to manually position a subassembly in its assembled configuration, release it, and then insert, align, and tighten any bolts or other operational fasteners that hold the subassembly in place while the rack is in use. Similarly, during disassembly the bolts or other fasteners may be removed without the subassemblies falling off the rack or requiring the end user to hold them in place while the fasteners are removed from the rack. The term operational fastener means the fasteners that secure the bicycle rack in an assembled configuration while it is in use.

Referring now to FIG. 1A, an end perspective view of an embodiment of the inventive bicycle rack is depicted in a partially assembled configuration. In the depicted embodiment a vehicle attachment assembly 102 is provided to connect the bicycle rack to a vehicle. The type of attachment to the vehicle is not limiting of the current invention, and assembly 102 could be a receiver hitch mounted device, a tow ball mounted device, or an assembly designed to attach to the trunk or hatch back of a vehicle or a bed rack on a truck, among other attachments. It may or may not be provided with a pivoting function. The inventive rack may be used with any type of vehicle attachment assembly 102. For example and without limiting the foregoing, in some embodiments of the inventive device the assembly 102 may be a portion of a cargo rack, a truck bed rack, or a roof rack.

In the depicted embodiment a support member 104 is attached to the vehicle attachment assembly 102 and extends from the vehicle attachment assembly 102 to support the equipment to be carried on the rack 100. In varying embodiments, the support member 104 may provide support to one or more bicycles held on the rack 100. The bicycles may be supported on the rack 100 by platform members 106 that are attached to and extend outwardly from the support member 104.

In the depicted embodiment, both members 106 are platforms that may receive a bicycle tire anywhere along their length to accommodate many different size bicycles. In other embodiments, one or both platforms 106 may comprise a tire cradle, a part of a hanging style rack, or another type of bicycle support.

Various devices are utilized to secure the tires on the platforms 106, but those mechanisms are not shown in the figures since they do not comprise part of the inventive device. One of skill in the art will be aware of a variety of such mechanisms to hold the bicycle wheels or frame on the platforms 106, such as ratchet straps, hoop arms, wheel hooks, tire cradles, and other such mechanisms. One example of such a mechanism is disclosed in U.S. Pat. No. 10,668,866 which is incorporated herein by reference.

In the depicted embodiment, two such platforms 106 are provided for each bicycle to be stored on the rack. One platform 106 supports the rear wheel and the other platform 106 supports the front wheel. In other embodiments, only one of the members 106 may be a platform member, and the other may be a cradle for receiving the tire of a bicycle. In other embodiments, both members 106 may comprise tire cradles instead of platform members. The particular type of member 106 is not limiting of the invention. Additionally, the support member 104 may be temporarily attached to and supported by vehicle attachment assembly 102 using features in the same manner described below as platform members 106 use them to temporarily attach to the support member 104. In other embodiments, the support member 104 may be part of a cargo rack for a vehicle, a truck bed rack, a roof rack for a vehicle, or other types of vehicle accessories.

In FIG. 1A, the left-most platform member 106 is already in its final position on the support member 104 as it will be after full installation, while the right-most platform member 106 is still disconnected and disassembled from the rest of the bicycle rack 100. The inventive device allows an end user to place the right-most platform member 106a into the position shown in FIG. 1B and release it prior to attaching the permanent fasteners. As shown in FIG. 1, the left-most platform member 106 is temporarily supported in its final position by the surface features described below. It has not yet been fastened to the support member 104 by an operational fastener sufficient to hold it in place during operation or use of the rack 100.

When the user is preparing to assemble the rack 100, they may attach vehicle attachment assembly 102 to the vehicle with or without support member 104 being attached thereto. Support member 104 may be shipped to the end user already attached to the vehicle assembly member.

In a preferable method of assembling the inventive device, the vehicle attachment member 102 and support member 104 are attached to a vehicle before platforms 106 are attached to the support member 104. Either way the end user will attach platforms 106 to the support member 104 prior to using the device to carry bicycles or other equipment.

Referring to FIG. 1B, the right-most platform member 106 has been moved to its final position for installation and is now temporarily supported by the support member 104 through the surface features described below. It has been pivoted down into the final position to engage the surface features on the two components. In FIG. 2B neither platform member 106 is fastened to the support member 104 by an operational fastener but both are supported by it sufficient to hold them in the final position for assembly with bolt holes or other attachment points aligned as necessary for final operational attachment.

Figure 2B:
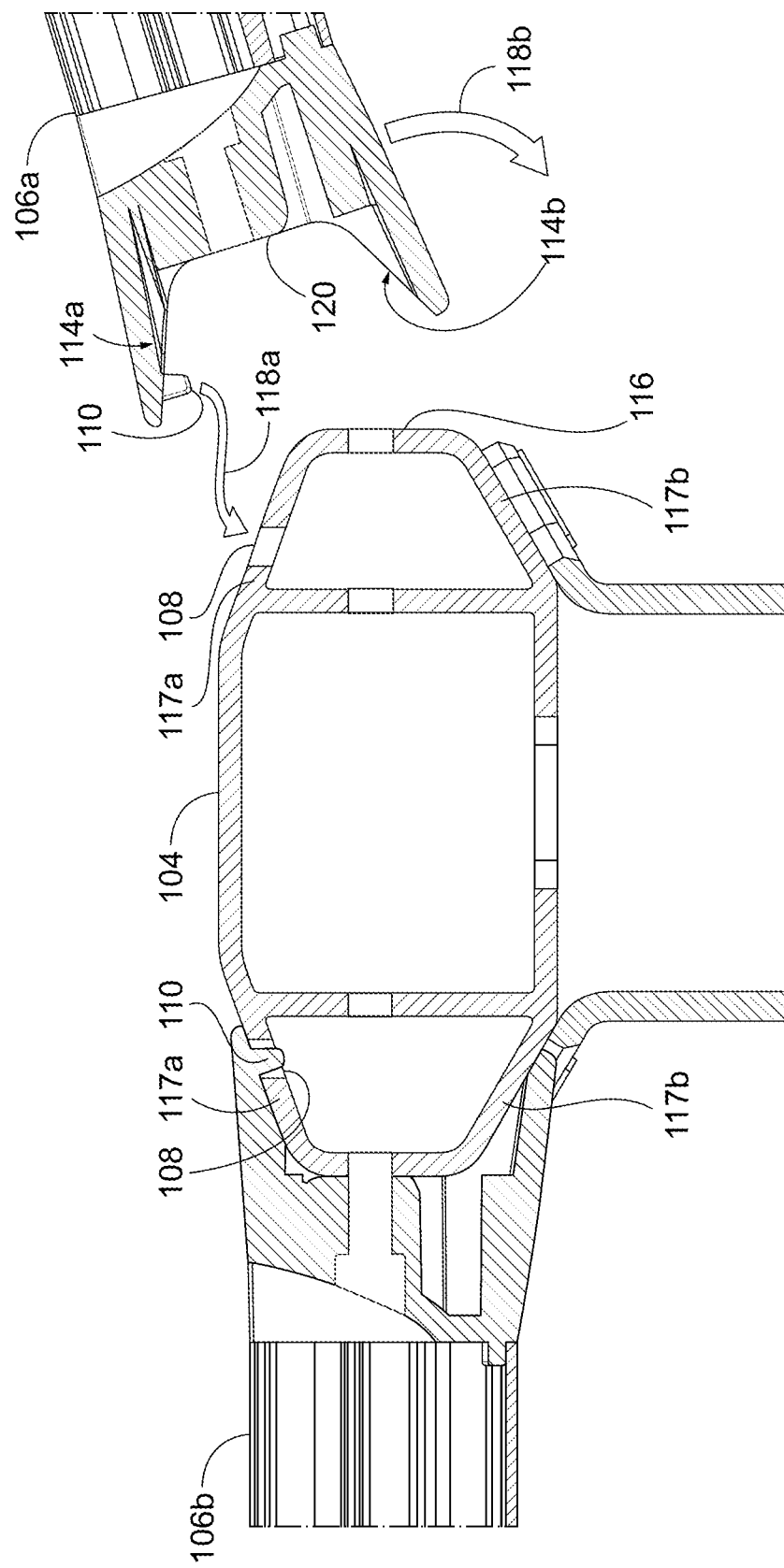
FIG. 2B is a detail cross-sectional view of an embodiment of the inventive bicycle rack in a partially assembled configuration.

Referring now to FIGS. 2A and 2B detail and cross-sectional views of the attachment between the support member 104 and platform members 106a and 106b are depicted, respectively, in the same configuration as depicted if FIG. 1A. In the inventive device, the support member 104 and the platform 106a are provided with surface features to engage each other and hold the platform 106a in the proper position with respect to support member 104 to allow installation of permanent or operational fasteners. In the depicted embodiment the support member 104 is provided with a surface feature 108 comprising an aperture through the outer surface of the support member 104. In some embodiments the feature 108 may be an indentation or a protrusion, not an aperture.

In the depicted embodiment the platform member 106a is provided with feature 110 that engages the feature 108 as the two subassemblies are attached together. In the depicted embodiment the feature 110 comprises a protrusion that may be inserted into aperture 108 while the platform 106a is held at an angle to the support member 104 as shown in FIG. 2B. The user inserts the feature/protrusion 108 as shown by arrow 118a.

In the depicted embodiment the platform 106a is then pivoted in the direction of arrow 118b to bring it to the desired position—the mirror image of the position of platform member 106b in FIG. 2B. The weight of the platform member 106a pulls downward causing the feature 110 to engage the lower side of aperture 108 and the end surface 120 of platform member 106 to press against side 116 of support member 104. This holds the platform member 106 in the proper orientation with respect to support member 104 without any other fasteners. In this case the fastener is a bolt that extends through holes in the platform members 106 and support member 104, and the holes are all aligned in the configuration shown in FIG. 1B with support only from the surface features.

Figure 2C:
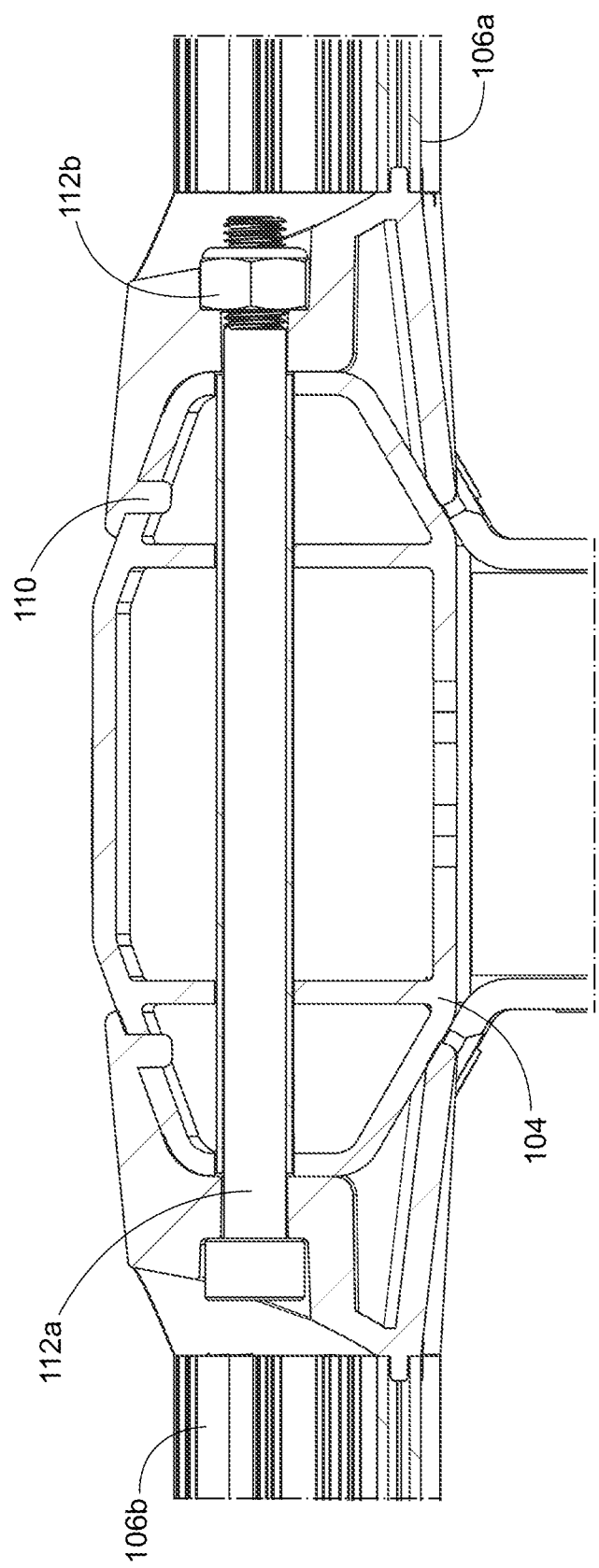
FIG. 2C is a detail cross-sectional view of an embodiment of the inventive bicycle rack in an assembled configuration.

Once the platform member 106 is held in the proper position the end user may install bolt 112a and nut 112b or other permanent or operational fasteners to secure the platform members 106 to the support member 104 for use to carry bicycles. An embodiment of the operational fastener is shown in FIG. 2C with a single bolt 112a extending through the end walls of both platform members 106 and through the support member 104 to pull them all together with the tightening of nut 112b. In other embodiments there may be one bolt 112a for each platform member 106 or similar subassembly.

In some embodiments, other surface features or shapes of the support member 104 and platform 106 may also assist in holding the platform member 106 in the desired position. For example, in the depicted embodiment, saddles/flanges 114a and 114b mate to chamfers 117a and 117b to provide additional positional support between the platform member 106 and the support member 104. FIG. 2C depicts the fully assembled equipment with operational fastener in place in the holes provided through the platform members 106 and the hole through the support member 104. Bolt 112a and nut 112b are securing the platform members 106 to the support member 104 by securing the end walls 120 of each platform member 106 against the opposing side walls of the support member 104. In other embodiments various operational fasteners may be utilized instead of bolt 112a and nut 112b.

Figure 3A:
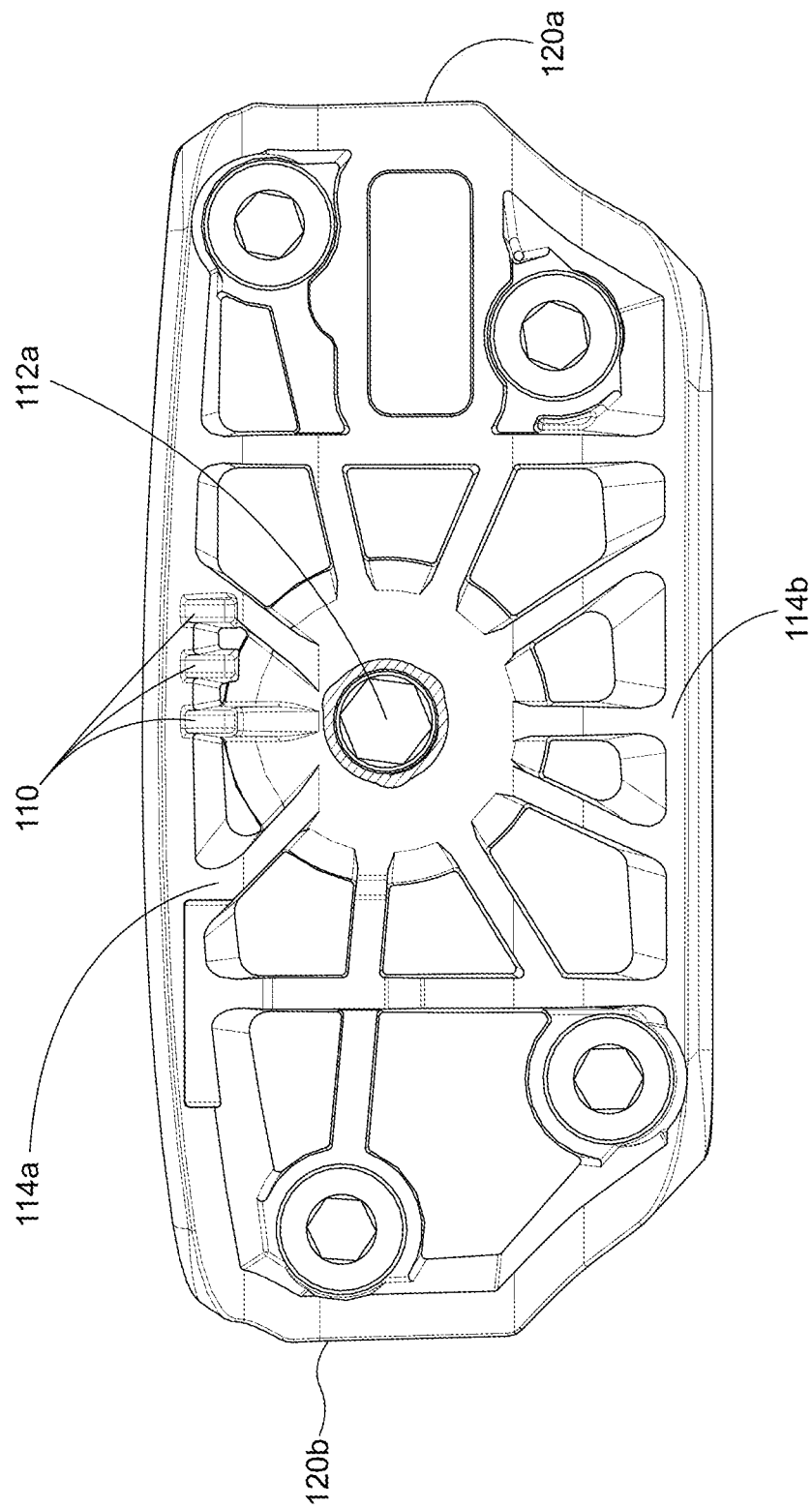
FIG. 3A is a side view of a portion of an embodiment of the inventive bicycle rack in a disassembled configuration.
Figure 3B:
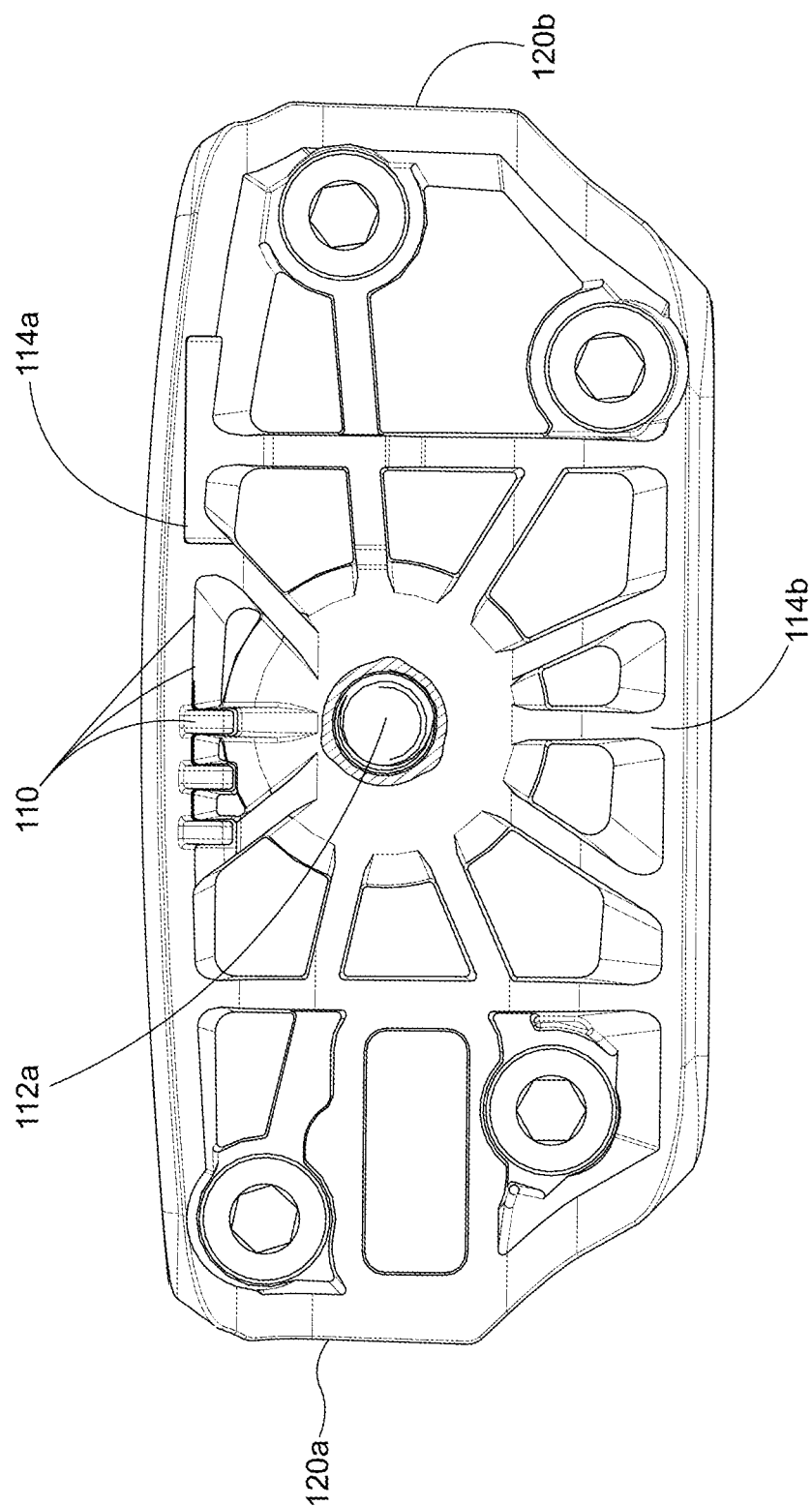
FIG. 3B is a side view of a portion of an embodiment of the inventive bicycle rack in a disassembled configuration.

Referring now to FIGS. 3A and 3B, end views of some optional embodiments of the platform members 106 are shown. In these views the platform members 106 are removed from the support member 104 to provide a view of the end surface 120 of each platform member 106. FIG. 3A depicts an embodiment of a platform member 106 configured for one side of the support member 104, while FIG. 3B depicts an embodiment of a platform member 106 configured for the opposite side of the support member 104. In these embodiments, the operational fastener 112 is depicted, and each end surface 120 of the platform members 106 has a front edge 120a and a back edge 120b intended to face toward the front end of the support member 104 or the back end of the support member 104, respectively. In these depicted embodiments the protrusions 110 are formed in this embodiment from three separate protrusions 110 of the same cross section, for example to reduce the mass and cost of the part while maintaining a desired overall effective width for the surface feature. As can be seen in these figures the end surfaces 102 and upper and lower saddle/flange features 114a and 114b may be formed from ribs or have cut out sections to reduce mass or cost of parts.

In embodiments such as those shown in FIGS. 3A and 3B, two left-side and right-side versions of the platform members 106 the protrusions 110 are offset either towards the front edge 120a or back edge 120b with respect to the hole for operational fastener 112. As a result of the offset between the protrusion 110 and the hole for fastener 112, if the left-side platform member 106 is placed on the right side of support member 104, or vice versa, with the protrusions 110 in the aperture 108, the hole for the fastener 112 in the end wall of the platform member 106 will not align with the hole for the fastener 112 in the support member 104. As a result, the user will not be able to insert the fastener/bolt 112 if either platform member 106 is placed on the wrong side of the support member 104. The holes in the support member 104 and the platform members 106 in these embodiments will only align to accept a fastener 112 if they are installed on the correct side of the support member 104. This prevents incorrect installation of the platforms 106 on the support member. In other embodiments the surface features may be offset farther from the fastener, or there may be more than one surface feature on each subassembly with shapes or distances that prevent incorrect positioning of the subassemblies.

In some embodiments of the depicted device the holes for fastener 112 are 0.375 to 0.41 inches in diameter, or in the range of 0.25 to 0.75 inches in diameter. In some embodiments the fastener 112 is a bolt with a shank from 5 to 6 inches long and a threaded portion of 0.5 to 1.5 inches long, having a diameter in the range of 0.25 to 0.75 inches. In some embodiments the protrusions 110 are in the range of 0.05 to 0.15 inches wide and in the range of 0.10 to 0.20 inches tall when viewed from the end view shown in FIGS. 3A and 3B. In some embodiments having multiple protrusions 110 the protrusions are spaced apart by a distance in the range of 0.05 to 0.10 inches and extend over a total width in the range of 0.5 to 0.75 inches. In some embodiments the protrusions 110 have a tip depth dimension (farthest from the flange 114) as shown in FIG. 2B in the range of 0.05 to 0.10 inches, and a base depth dimension (closest to the flange 114) as shown in FIG. 2B in the range of 0.10 to 0.20 inches. In some embodiments the aperture 108 is oval in shape with a major axis dimension in the range of 0.5 to 1 inches and a minor axis of 0.25 to 0.5 inches. In other embodiments the aperture is a rectangular aperture with a long dimension in the range of 0.5 to 1 inches and a shorter dimension in the range of 0.25 to 0.5 inches, with optional semicircular ends with a diameter matching the shorter dimension of the rectangle.

In one embodiment of a method of using the inventive system, a support member 104 is attached to a vehicle and supported by the vehicle in its operational position. One or more subassemblies such as platform members 106 are temporarily attached to the support member 104 by surface features. The subassemblies are supported by the support member without other support from a user or any other part of the rack 100. The subassemblies are supported in a configuration that allows operational fasteners to be inserted or attached to the subassemblies and the support member to secure them in place for operational use of the rack.

"Substantially" or "about" means to be more-or-less conforming to the particular dimension, range, shape, concept, or other aspect modified by the term, such that a feature or component need not conform exactly. For example, a "substantially cylindrical" object means that the object resembles a cylinder but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Changes may be made in the above methods, devices, and structures without departing from the scope hereof. Many different arrangements of the various components depicted, as well as components not shown, are possible without departing from the spirit and scope of the present invention. Embodiments of the present invention have been described with the intent to be illustrative and exemplary of the invention, rather than restrictive or limiting of the scope thereof. Alternative embodiments will become apparent to those skilled in the art that do not depart from its scope. Specific structural and functional details disclosed herein are not to be interpreted as limiting, but merely as a representative basis for teaching one of skill in the art to employ the present invention in any appropriately detailed structure. A skilled artisan may develop alternative means of implementing the improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A bicycle rack for a vehicle, the bicycle rack comprising:
   a support member configured to connect to a vehicle, the surface of the support member having an upper chamfer portion and a first attachment feature disposed on the upper chamfer portion;
   a platform member having an end with an upper saddle, wherein the upper saddle is configured to contact the upper chamfer portion of the support member in an assembled configuration, and a second attachment feature disposed on the upper saddle;
   wherein the first attachment feature is configured to engage the second attachment feature to support the platform member in the assembled configuration;
   wherein the first attachment feature comprises an aperture or an indentation, and the second attachment feature comprises a protrusion extending downwardly from the upper saddle; and
   wherein the protrusion comprises a tooth having at least one angled side.

2. The bicycle rack of claim 1, the support member further comprising a side wall adjacent to the upper chamfer portion thereof, and
   the platform member further comprising an end wall adjacent to the upper saddle thereof;
   wherein the side wall of the support member is configured to contact the end wall of the platform member when the platform member is in the assembled configuration.

3. The bicycle rack of claim 2,
   wherein the support member further comprises a lower chamfer portion; and
   wherein the platform member further comprises a lower saddle; and wherein the lower chamfer portion is configured to contact the lower saddle when the platform member is in the assembled configuration.

\* \* \* \* \*